(No Model.) 2 Sheets—Sheet 2.

H. W. MORGAN.
NAILING MACHINE.

No. 596,902. Patented Jan. 4, 1898.

WITNESSES:
G. Willard Rich.
Grace A. Roda.

INVENTOR:
Henry W Morgan
by Church & Church
his Attys

UNITED STATES PATENT OFFICE.

HENRY W. MORGAN, OF ROCHESTER, NEW YORK.

NAILING-MACHINE.

SPECIFICATION forming part of Letters Patent No. 596,902, dated January 4, 1898.

Application filed May 13, 1897. Serial No. 636,340. (No model.)

*To all whom it may concern:*

Be it known that I, HENRY W. MORGAN, of Rochester, in the county of Monroe and State of New York, have invented certain new and useful Improvements in Nailing-Machines; and I do hereby declare the following to be a full, clear, and exact description of the same, reference being had to the accompanying drawings, forming a part of this specification, and to the reference-numerals marked thereon.

My present invention relates to nailing-machines, such as shown in Letters Patent No. 587,321, granted to me August 3, 1897, particularly adapted for nailing boxes, and has for its object to improve the construction and operation of the nail-chuck supports and drivers and the means for operating them, whereby the operation and adjustment of the parts are improved; and to these and other ends it consists in certain devices hereinafter described, the novel features being pointed out in the claims at the end of this specification.

Figure 1:
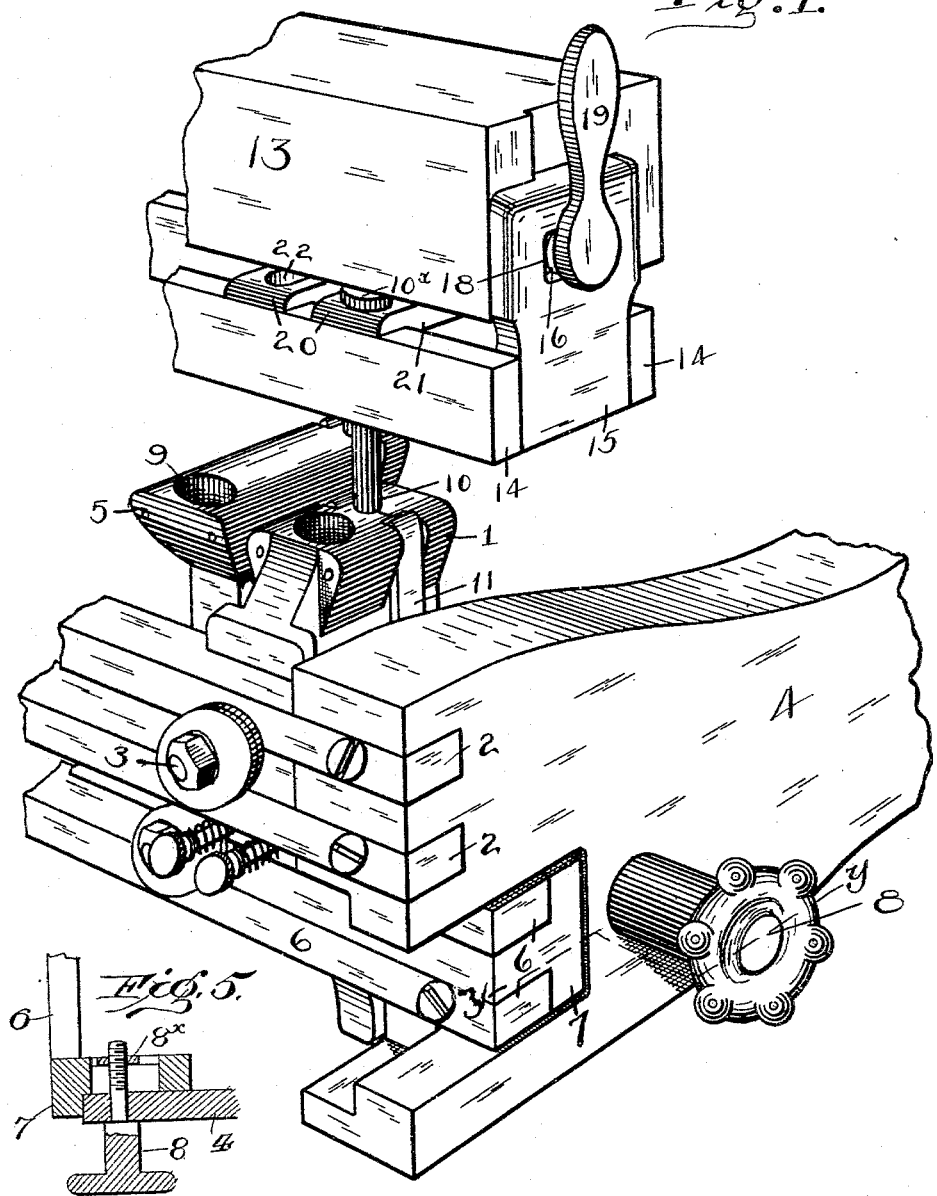
Figure 2:
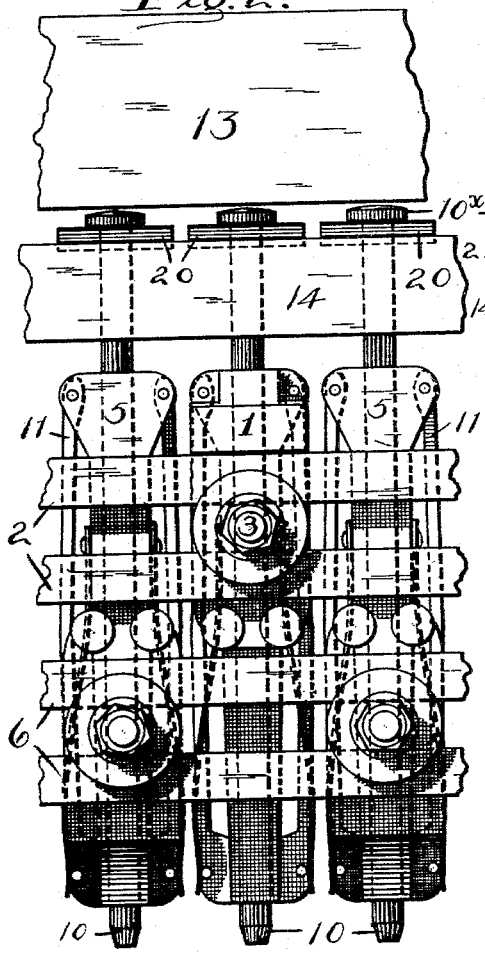
Figure 3:
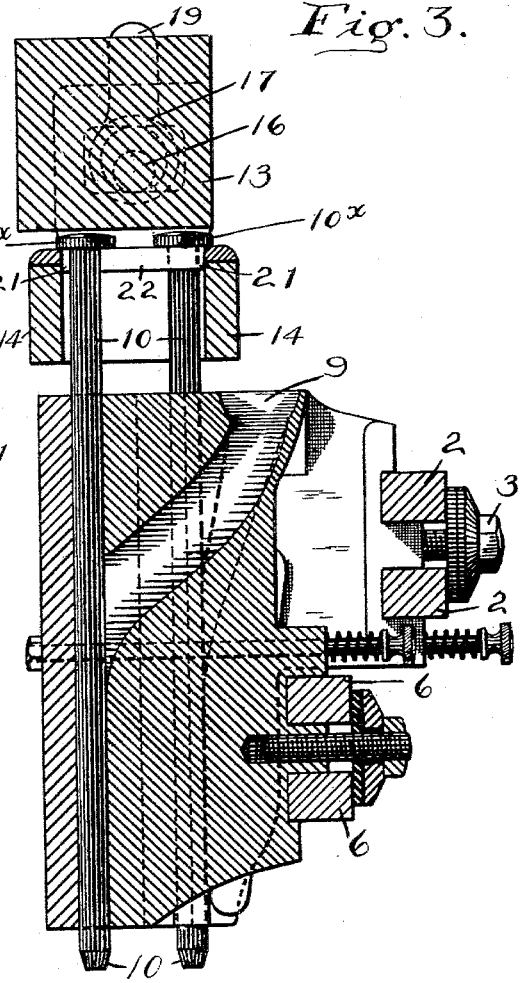
Figure 4:
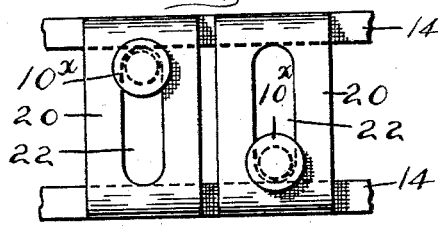

In the drawings, Figure 1 is a perspective view of the nail chucks and drivers of a nailing-machine, showing my present improvements; Fig. 2, a front elevation of the chucks and drivers; Fig. 3, a sectional view of the same; Fig. 4, a plan view of the nail-drivers and their supports; Fig. 5, a section on the line $y\ y$ of Fig. 1.

Similar reference-numerals indicate similar parts.

The nail-chucks are preferably of the construction illustrated in my pending application referred to and are arranged in two rows or sets, one set 1 being secured to bars or supports 2 by bolts 3, and said bars 2 are in turn rigidly secured to brackets 4 on opposite sides of the main frame, only one of the brackets being shown herein. The nail-chucks 5 of the other row are similar in general construction to the chucks 1 and are secured to bars or supports 6, attached to blocks 7, which latter are adjustable back and forth on the brackets 4 and adapted to be fastened in adjusted position by bolts 8, entering nuts $8^\times$ on the slotted inner sides of the blocks 7 and prevented from turning therein, as shown in Fig. 5, the object of the adjustment being to permit one row of chucks to be moved in rear of the other, so that the nails may be driven in two parallel rows, or the chucks may be moved in line and the nails all driven in one continuous row, if desired.

As far as my present invention is concerned it is immaterial what the specific forms of chucks 1 and 5 are; but the ones shown embody nail-channels 9, into which the nails are fed, leading to the passages in which the nail-drivers 10 operate, suitable nail-holding jaws 11 being provided at the bottom of the driver-channels.

13 indicates the driver-bar of a nailing-machine of any suitable description and actuated at suitable intervals to drive the nails held in the chucks, and 14 a slotted driver-support, preferably composed of two rods arranged beneath the driver-bar and adjustably connected to it, so as to be capable of an independent vertical movement to hold the heads of the drivers 10 close to the driver-bar 13 and permit their adjustment and removal, when desired. In the present embodiment this support is secured to or forms part of blocks 15, sliding in vertical ways formed on each end of the driver-bar, and the vertical adjustment is obtained by rotatable pins 16, journaled in the ends of the bar 13, having cams 17 coöperating with recesses 18 in the blocks 15 and provided with operating-handles 19, as shown. I only deem it necessary to show herein one end of the driver-bar and one operating device for the driver-supports, and it will be understood that the arrangements at the other end are similar.

20 indicates plates resting loosely upon the support 14, having shoulders 21 for preventing their movement laterally of said support, but not preventing their free movement longitudinally thereof. Each of these plates is provided with a slot 22, extending transversely of the supports for the accommodation of the body of the driver, and the drivers or punches 10 are provided with the heads $10^\times$, resting upon said plates 20, and the heads being close to the driver-bar the drivers will be actuated downwardly by said bar and lifted by the support during the movements of the driver-head.

The drivers 10 have a sufficiently long bearing in the chucks, so that they will be moved with the chucks when the latter are adjusted, even though the drivers are raised from the position shown in the drawings a sufficient distance to allow nails in the nail-channels to pass to the holding-jaws.

From this construction it will be seen that the nail-chucks can be adjusted longitudinally of their supports, carrying with them the drivers and their supporting-plates 20, and also that the adjustable rows of chucks can be moved forward and backward (by the movement of the supports 6) on the brackets also carrying the drivers, the shanks of the latter moving in the slots in the plates 20, and the heads of all the drivers are all the time beneath the driver-bar.

When it is desired to remove any or all of the drivers and chucks, the latter are disengaged from their supports, and the driver-support 14 being lowered the drivers may be slipped out of the plates 20.

This arrangement permits all the necessary adjustments of the chucks and drivers beneath the driver-bar by a simple means and any number of plates 20 and drivers may be readily applied or removed, the parts being duplicates and cheaply constructed.

The nails may be fed to the chucks by any suitable devices or by hand, if desired, and any suitable means may be provided for actuating the driver-bar.

I claim as my invention—

1. In a nailing-machine, the combination with the driver-bar, the slotted driver-support arranged beneath it, of the slotted plates movable longitudinally of the support, and the drivers having the heads and passing through the slots in the plates, substantially as described.

2. In a nailing-machine, the combination with the driver-bar, the driver-support beneath it vertically movable with said bar and adjustable upon it, of the slotted driver-plate loose on the support, and the driver having the head and passing through said plate, substantially as described.

3. In a nailing-machine, the combination with the driver-bar and the slotted driver-support beneath it, the blocks 15 at the ends of the support, and adjustable connections between said blocks and the driver-bar, of the headed drivers supported upon the driver-support beneath the driver-bar and movable laterally and longitudinally independently of the support, and the nail-chucks adjustably supported beneath the driver-bar with which the drivers coöperate and movable laterally and longitudinally of the support with the drivers, substantially as described.

4. In a nailing-machine, the combination with the driver-bar and the slotted driver-support beneath it, of the slotted plates 20, two rows of drivers having the heads, and two rows of nail-chucks with which the drivers coöperate, said rows being relatively adjustable, substantially as described.

HENRY W. MORGAN.

Witnesses:
DANIEL N. SALISBURY,
F. F. CHURCH.